United States Patent Office 2,756,497
Patented July 31, 1956

2,756,497

FLUX AND METHOD OF SOLDERING WITH SAME

William S. Gale, Detroit, Mich., assignor to McCord Corporation, Detroit, Mich., a corporation of Maine No Drawing. Application July 9, 1952,
Serial No. 298,003

23 Claims. (Cl. 29—495)

This invention relates to the art of joining metals and is particularly concerned with providing new, improved, and commercially useful flux compositions and methods particularly useful in the surface treatment, coating, and soldering of metals such as aluminum and its alloys.

There are already available a number of satisfactory processes for treating, coating, and soldering many of the commonly used metals. Several important metals, such as aluminum and its alloys, are not so readily treated, however, and as a result, the use of aluminum has not been fully exploited even though its many advantageous properties would ordinarily suggest that it might be particularly suited for many uses.

The joining of aluminum to itself and other metals has heretofore been limited for the most part to such techniques as riveting, brazing, and welding, because no satisfactory method for the soldering of aluminum was previously available. Of these methods, only brazing and welding have in the past permitted aluminum to be integrally united to itself and other metals.

There are many objections to brazing. The manufacturing equipment necessary both for salt-bath and furnace brazing is costly and complicated and not readily available. The fluxes which are required for brazing are extremely corrosive, utilize rare components, and are also costly. The jigs and fixtures which hold the work in assembly during brazing are readily corroded by the brazing flux and must be frequently replaced. The brazing cycle must be carefully controlled both as to temperature and time within the limits of a few degrees and seconds, and ordinarily requires temperatures near the melting point of aluminum itself and time cycles of great length. The presence of fluorides and other halides in the brazing fluxes requires that corrosion resistant metals be used in the exhaust system which must be provided to carry away the irritating and corrosive fumes resulting from brazing. Furthermore, brazing requires the use of thicker metal sections than might otherwise be necessary if viewed simply from the standpoint of design. One reason for this is that thin metals are occasionally perforated by the corrosive brazing fluxes and warped by the excessive temperatures. Another reason is that tolerances between parts must be carefully controlled in order that the brazing metal will flow into the interstices.

After the completion of brazing, the articles must be carefully washed and pickled to remove the corrosive flux residues. While the cleaning processes now used remove much of such flux residues, it is nearly always impossible to remove every trace and there is certainly no method for removing residues of the corrosive flux trapped within the brazed joints. These occluded flux particles can be expected to cause trouble as they corrode and etch the metal of the joint.

Welding of aluminum requires even more carefully controlled process cycles and a high degree of skill on the part of the operator. This type of joining has limitations because thin metal sections cannot be welded, and many types of structures have joints which are not accessible to the welding operator.

In summary, it can be said that the known methods for welding and brazing aluminum and its alloys simply do not provide a satisfactory means for integrally uniting aluminum to itself and other metals in the vast majority of cases. As a result, industry, while continuing to utilize these methods, has searched for a method of soldering aluminum which would eliminate many of the difficulties hereinbefore enumerated and which could be practiced with easily learned skills and readily available tools. In spite of the great need for a satisfactory soldering method and the vast amount of effort devoted to this problem, none has been developed heretofore.

The reason for the failure of prior attempts to solder aluminum can be traced to the fact that a dense coating of oxide covers aluminum surfaces exposed to the atmosphere, and this oxide coating cannot be removed with the known fluxing agents, including those which work well on other metals such as copper and brass. The presence of oxides and other foreign material seriously inhibits or entirely prevents the solder from alloying with the metals being joined. This alloying action is essential to soldering.

Many attempts have been made in the past to find a reliable and effective method for soldering aluminum and its alloys which would perimt the use of a wide variety of solders with physical characteristics selected for the particular function the joint is to perform in service. Such methods have contemplated the use of a flux composition which would prepare the surfaces of the aluminum and other metals of the joint system so that the molten solder would alloy with these metals. It is recognized that one of the essential requirements of such a fluxing composition, in addition to its ability to enable effective soldering, would be that the flux must not leave corrosive residues within or surrounding the soldered joint after the soldering operation is completed. Other requirements are that the fluxing ingredients should be readily obtainable, and that the use of the compositions should introduce a minimum of health hazards. A further requirement is that the flux should be useable as a dry powder, paste, or liquid.

It is desirable that there be a wide choice of protective and decorative coatings for a given metal in order to increase its utility. In the field of chemically deposited surface treatments, aluminum and its alloys are especially lacking in this versatility for nearly the same reasons given in explaining the difficulties encountered heretofore in soldering. Therefore, there is a need in the art for a method of coating aluminum and its alloys with various metals, alloys, and solders for decorative, protective, and other purposes.

I have discovered flux compositions and methods for their use which will achieve these and other objects and which make it possible to treat, coat, and join aluminum and other metals.

One of the foremost advantages of my invention is that it makes it possible now for the first time to obtain effective soldering of aluminum to itself and other metals, and to produce joints having excellent physical properties, including those of heat transfer, electrical conductivity, and strength. Such soldering can be practiced with a wide variety of solders, and the ease with which such soldering can be accomplished permits this technique to be used with nearly all of the commercially existing methods for soldering.

In contrast to brazing and welding, the range of soldering temperatures and the timing of the soldering cycles are so flexible that it is merely necessary to provide enough heat to activate the flux to flux the metals of the joint system and to melt the solder. The temperature of such soldering is not critical and can be varied over a range of several hundred degrees F., for example, over a range of 500° to 900° F. The time cycle required is only a small fraction of that required for brazing. Once the flux has been applied it is only necessary to bring the parts to the soldering temperature without resorting to the preheating techniques required in brazing. The capillarity of my fluxing compositions and of the solders flowing over surfaces prepared by such fluxes is so great that the solder penetrates great distances between the metals being joined, such for example as between the strands of a wire cable, and the irregularity of the capillary passages need not be a matter of concern because of this powerful action.

This is in marked contrast to brazing, which requires that tolerances between the parts be carefully controlled. My invention minimizes the restrictions heretofore placed on the thickness, finish, and tolerances of the metals to be joined.

In practicing my invention the flux together with the coatings on the metals of the joint system are completely volatilized during soldering in many cases. If any residues remain they will be found to be noncorrosive or readily soluble, so that the ultimate corrosion resistance of the joint depends entirely on the corrosion resistance of the metals of the joint system. Furthermore, by selecting the proper solder it is possible to achieve soldering without discoloring the aluminum.

The components of the fluxes embodying my invention are readily available, present no special problems in handling, and may be used in the form of dry powders, pastes, or liquids, whichever form is most convenient to use. My fluxes can be used according to most of the techniques commonly used in soldering. The fumes evolved during soldering are comparatively noncorrosive, and consequently the jigs and fixtures used for holding the parts in assembly during soldering are not subject to rapid deterioration.

It has thus been made possible to join aluminum to itself and other metals, provided that the solder selected has the property of being able to alloy with the metals of the joint system. As a result of the foregoing, excellent solder joints can now be produced at a cost which enables the use of aluminum, its alloys, and other difficult to solder metals in many applications where the desirability of using such metals has long been recognized.

Additional uses for flux compositions according to my invention have been developed to provide a means for treating and coating aluminum and other metals for decorative, protective, and other purposes. Using these flux compositions it is possible to coat aluminum, its alloys, and other metals by chemical deposition with a plating or film of various metals and metal alloys which are useful in themselves as decorative coatings or corrosion resistance coatings, or they may be used in an intermediate step for further plating or soldering operations. My flux compositions may also be used to provide articles of manufacture made from aluminum, its alloys, and other metals with solder coatings useful in joining the same to other metals or as a protective coating. The composition, quality, and physical characteristics of these coatings depend upon the amount of the particular flux composition which is used and also upon the solder (if any) which may be used in connection therewith.

A principal object of my invention, therefore, is to provide a novel and highly useful composition of matter, and methods useful for employing such composition in treating meals.

Another object of the invention is to provide a novel and highly useful method of joining metals, particularly aluminum, to themselves or other metals, and a composition of matter useful in connection therewith.

Another object of the invention is to provide a new and useful method of soldering and a flux useful in connection therewith.

Another object of the invention is to provide a new and useful method of plating or coating metal, and a composition of matter useful in connection therewith.

The composition of matter embodying my invention essentially comprises as a first component one or more halide salts of a metal of the class consisting of zinc, cadmium, tin, antimony, bismuth and lead; as a second component a fluxing salt of the class consisting of semicarbazide salts, hydrazine salts, salts of hydrocarbon substituted hydrazines, and salts of heterocyclic substituted hydrazines, or mixtures thereof; and as a third component a compound selected from the group consisting of hydroxylamine salts, morpholine salts, ammonium salts, alkylamine salts, arylamine salts, aralkylamine salts, alkarylamine salts, cycloalkylamine salts, saturated cyclic hydrocarbon amine salts in which the amino nitrogen is present in the cyclic structure, $R_1R_2R_3R_4NX$ in which $R_1$, $R_2$, $R_3$ and $R_4$ are methyl or ethyl radicals and in which X is a halogen atom, and aliphatic carboxylic acid amides containing from one to six carbon atoms, or mixtures thereof. In general, the composition will comprise about 5 to 90% by weight of the first component, based upon the weight of the first, second and third components, and from about 2 to about 90% by weight of the third component, based upon the weight of the second and third components.

The first component of the composition can be, for example, stannous chloride, zinc chloride, zinc dihydrazine chloride, cadmium ammonium chloride, stannous bromide, zinc bromide, cadmium ammonium bromide, 3,5,5-trimethylpyrazoline zinc chloride, cadmium chloride, cadmium bromide, zinc dihydrazine bromide, cadmium dihydrazine chloride, cadmium dihydrazine bromide, zinc ammonium chloride, zinc ammonium bromide, or mixtures thereof.

The second component of the composition can be, for example, hydrazine monohydrochloride, hydrazine monohydrobromide, 3,5,5-trimethylpyrazoline hydrochloride, or 3,5,5-trimethylpyrazoline hydrobromide, or mixtures thereof.

The third component of the composition can be, for example, ammonium chloride, ammonium bromide, or mixtures thereof.

According to my invention, metal may be treated with a composition of matter according to the foregoing formula by a process which includes the steps of applying such composition of matter to the surface of the metal and activating such composition of matter so as to deposit a metallic film on the metal as a result of the decomposition of said matter.

As used herein, unless otherwise indicated, aluminum shall include a reference to its alloys.

Reference herein to a joint or soldering system or union shall be construed to include a solder or joining metal and one or more metals to be joined.

Said composition of matter comprises a flux which is useful in joining or treating metals. By activation of the flux I mean the melting and/or fusing and/or decomposition of the flux at elevated temperatures which fluxes the metals of the soldering system or which produces a fluxing action, namely, the removal of the oxides of metals and other interfering films and coatings from the metals to be joined or treated, by reacting with such oxides, films, and coatings, either to dissolve, reduce, deterge, or replace the same. The fluxing action is carried out by the flux in a fluid condition. In a soldering or joining process the flux should be in a fluid condition during the step of forming the soldered union, throughout the plastic range of the solder, and until the molten solder has ceased to flow.

My invention contemplates the use of a flux according to the foregoing formula in a method of applying a solder to a metal, and which method includes the steps of applying the flux to said metal, activating the flux, and applying molten solder to the fluxed area of the metal.

My invention is also useful in connection with the integral joining of metals by a method which includes the steps of applying flux to one or more metals of the joint system, activating said flux, applying molten solder to the fluxed area of said metal or metals, and employing said solder integrally to unite the metals of the joint system.

The flux may be applied in any conventional manner and in a liquid, paste, or powder form. If applied in liquid form, the flux may be heated to melt the same without activating it, or the flux composition may be dissolved in a suitable solvent or suspended in a suitable vehicle, such for example as solvents of the class consisting of the alcohols, the glycols, the ketones, water, and the methyl and ethyl esters of acetic acid and miscible mixtures thereof in which said flux will dissolve without hydrolysis. Among my preferred solvents are ethylene glycol, methyl and ethyl alcohol, acetone, methyl and ethyl esters of acetic acid, miscible mixtures thereof and water combined in suitable proportions with the flux so that the flux components do not undergo sufficient hydrolysis to destroy the efficacy of the flux, and miscible mixtures of water with the foregoing solvents.

The percentage of fluxing agent present in liquid solution in general is not critical and may be from 20 to 40% or more by weight of the resulting composition. However, the actual amount of fluxing agent required is only that necessary to provide effective soldering. An explanation for these varying percentages may be found in the fact that the character and condition of the metals to be joined and the function the joint is to perform in service determine to a large extent the amount of fluxing agent required.

The solder may be applied to the fluxed metal in any manner, including those now commonly employed, and the heat of the molten solder or the heat applied to melt the solder may be employed to activate the flux, or if desired, any other arrangements may be employed for heating the flux, the prerequisites being that the flux should be in a substantially fluid condition at temperatures below the solidus temperature of the solder and should be in a substantially fluid condition throughout the plastic range of the solder and until the molten solder has ceased to flow.

In practicing my invention the solder preferably comprises one or more metals of the class consisting of zinc, cadmium and tin, and alloys of zinc, cadmium, tin, antimony, bismuth, silver, copper, aluminum, manganese, nickel, chromium, lead, metals of the zirconium class, cerium, mixtures of cerium and the rare earths, including the combination known as misch metal, and beryllium.

If it is desired to use the aforesaid flux composition in the form of a paste, it may be admixed with a plastifying agent, such as petroleum jelly, lubricating oils, acetone, and the like, or small percentages of any of the solvents heretofore mentioned.

The fluxing agent may be applied by any convenient means or manner, such for example as by distributing the flux salts either individually or as a mixture on a surface to be soldered, by dusting the powder on the surface or by dipping one of the metals of the joint system in the flux. When using the flux as a dry powder it is sometimes advantageous to heat one of the metals of the joint system before dipping it into the dry powder to a degree sufficient to cause the powder to adhere to the metal without activation of the flux. The flux may also be sprayed, either as a powder or a liquid, or the metal to be fluxed may be washed with a flux solution.

In addition to and/or in lieu of the specific metal halide salts heretofore mentioned, the first component of said composition can include other halide salts of the specified metals. For example, antimony tribromide, antimony trichloride, bismuth tribromide, bismuth trichloride, lead chloride, and lead bromide can be used, and the fluorides and the iodides of the metals can be used.

The second component of said composition of matter can include in addition to and/or in place of the salts specifically mentioned one or more corresponding salts of hydrocarbon substituted hydrazines or heterocyclic substituted hydrazines. Some of the hydrocarbon substituted hydrazines which can be used in the form of their salts fall within the scope of the general formula $$R_5R_6N-NR_7R_8$$

in which $R_5$, $R_6$, $R_7$, and $R_8$ can be the same or different alkyl, aryl, aralkyl, alkaryl, or cycloalkyl radicals. Among the hydrocarbon radicals which can be present in the compounds of the formula $R_5R_6N-NR_7R_8$ are the methyl, ethyl, normal propyl, isopropyl, normal butyl, isobutyl, secondary butyl, phenyl, benzyl, phenylethyl, orthotolyl, metatolyl, paratolyl, xylyl, ethyl phenyl, cyclopentyl, and cyclohexyl radicals. Thus, in place of the particular hydrazine salts mentioned above there can be added and/or substituted the corresponding salts of symmetrical dimethyl hydrazine, unsymmetrical dimethyl hydrazine, trimethyl hydrazine, tetramethyl hydrazine, N-methyl-N'-phenyl hydrazine, N,N'-diphenyl hydrazine, benzyl hydrazine, methyl hydrazine, or cyclohexylhydrazine. Other hydrocarbon substituted hydrazines which can be used in the form of their salts are pentamethylene hydrazine, hexamethylene hydrazine, 3,5,5-trimethylpyrazoline, acetone hydrazone (($CH_3$)$_2$C=N—$NH_2$) and similar compounds prepared by the reaction of hydrazine and dialkyl ketones. Among the suitable heterocyclic substituted hydrazines which can be used in the form of their salts is 2-pyridyl-hydrazine.

Also, in place of such particular hydrazine salts mentioned above, there can be substituted one or more other salts thereof, such as hydrazine dihydrofluoride, hydrazine dihydroiodide, trihydrazine dihydroiodide, hydrazine phosphate ($NH_2$—$NH_2$·$H_3PO_4$), hydrazine hypophosphate ($NH_2$—$NH_2$·$H_4P_2O_6$), hydrazine formate ($NH_2$—$NH_2$·2HCOOH), hydrazine acetate $$(NH_2-NH_2 \cdot 2CH_3COOH)$$

hydrazine oxalate ($NH_2$—$NH_2$·$H_2C_2O_4$), and hydrazine abietate ($NH_2$—$NH_2$·$2C_{20}H_{30}O_2$). The hydrazine salts used as the second component can also be double hydrazine-metal halides, such as $$2N_2H_5Cl \cdot ZnCl_2, N_2H_5Cl \cdot CdCl_2, N_2H_5Cl \cdot ZnCl_2$$
$$N_2H_5Cl \cdot SnCl_2, 3N_2H_5Cl \cdot SbCl_3$$

and 3,5,5-trimethylpyrazoline zinc chloride. Among the semicarbazide salts which can be used are semicarbazide hydrochloride, semicarbazide hydrobromide, semicarbazide hydrofluoride, and semicarbazide phosphate $$(NH_2NHCONH_2 \cdot H_3PO_4)$$

In addition to and/or in place of the ammonium salts mentioned above, the third component can comprise a salt or salts of hydroxylamine, morpholine, alkylamines, arylamines, aralkamines, alkarylamines, cycloalkylamines, or saturated cyclic hydrocarbon amines in which the amino nitrogen is present in the ring. Among the hydroxylamine salts which may be used are hydroxylamine hydrochloride, and hydroxylamine hydrobromide. Among the alkylamines, arylamines, aralkylamines, alkarylamines, and cycloalkylamines which can be used in the form of their salts are those which fall in the scope of the formula $R_9R_{10}R_{11}N$ in which $R_9$, $R_{10}$, and $R_{11}$ are the same or different and are, for example, methyl, ethyl normal propyl, isopropyl, normal butyl, isobutyl, phenyl, benzyl, phenylethyl orthotolyl, metaolyl, paratolyl, xylyl, cyclopentyl, and cyclohexyl radicals. For example, among the amines which can be used in the form of their salts are methylamine, dimethylamine, trimethylamine, methylethylamine, triethylamine, monoisopropylamine, diisopropylamine, aniline, benzylamine, phenylethylamine, orthotolylamine, metatolylamine, paratolylamine, the xylidines, methyl aniline, dimethyl aniline, diethyl aniline, cyclohexylamine, ethylenediamine, etc. Piperidine in salt form can also be used.

In place of the hydroxylamine salts, morpholine salts, ammonium salts, and amine salts there can be used compounds of the formula $R_1R_2R_3R_4NX$ in which $R_1$, $R_2$, $R_3$, and $R_4$ are substituents selected from the group consisting of the methyl and ethyl radicals and in which X is a halogen atom, for example, tetraethyl ammonium chloride or tetraethyl ammonium bromide. The use of other salts as the third component is also included within the scope of this invention, for example, zinc ammonium chloride or bromide, cadmium ammonium chloride or bromide, ammonium carbonate, ammonium fluoride, ammonium phosphate, or aliphatic carboxylic acid amides containing from one to six carbon atoms, for example, formamide, acetamide, propionamide, dimethyl formamide, diethyl formamide, etc.

In testing the efficacy of the flux compositions of my invention a measured amount of flux and solder was applied to an aluminum panel which was heated until the flux became activated and the solder melted and flowed. On cooling, it was found that the solder had integrally united with the aluminum. It was observed in many cases that the flux either volatilized completely or left residues which were non-corrosive and/or readily soluble. Samples were tested for the presence of corrosive residues. The solder coated panel was rinsed and then washed with distilled water which was collected in a beaker. The addition of silver nitrate to such distilled water wash revealed that no halide ions were present. Additional corrosion test have revealed that if any residues are left which are not sensitive to this test, they are at least completely non-reactive with respect to the metals of the joint system.

Further tests were carried out to determine the effectiveness of these fluxing compositions in soldering aluminum to itself and other metals, such as copper, brass, zinc, and stainless steel. In some cases these tests consisted merely of forming lap and butt joints between strips of the metals enumerated, the thickness of the metals in some cases being as low as a few thousandths of an inch. In other cases useful articles of manufacture, such as heat exchangers in the form of automotive radiators and heater cores comprising solder coated brass or copper tubes and aluminum convecting fins were produced. Electrical conductors of the type used as automotive battery cables were also produced, and these comprised stranded aluminum wire conductors of varying sizes, including 1/0. Aluminum and/or brass and/or copper terminals were soldered thereto. The conductors in some cases were simply solder dipped to unite the strands in a solid mass, and in other cases cast brass lugs were also soldered to aluminum battery cables of the foregoing description.

As an indication of the efficiency, durability, and usefulness of such articles of manufacture, the following test results are cited:

An aluminum terminal soldered to an aluminum battery cable with 30/70 tin-zinc solder using a flux composition comprising zinc chloride, stannous chloride, hydrazine monohydrochloride, and ammonium chloride in the weight ratio of 14:165:16:4, respectively, was subjected to a tensile test. The aluminum cable failed under a direct tensile load of 1100 lbs. which was considered to be the ultimate strength of the cable itself. This failure occurred at a distance from the soldered joint which was examined and found to be completely intact. In comparison, a cable and terminal of the same description soldered according to the best previously available practice failed under 200 lbs. of direct tensile load, the failure taking place within the joint.

An aluminum battery cable soldered according to my invention was tested for electrical conductivity after four months' exposure on a test car, and its electrical resistance, 140 micro ohms, was found to have remained substantially unchanged.

A heat exchanger of the type shown in Seemiller U. S. Patent No. 2,252,210 was assembled using lock seam brass tubing coated with 30/70 tin-zinc solder and using fin sections made out of 3S aluminum. The radiator was assembled in accordance with Seemiller U. S. Patent No. 2,252,211 and was soldered in an oven using a flux comprising stannous chloride, hydrazine monohydrobromide, and ammonium chloride in the weight ratio 4:4:1, respectively, dissolved in ethylene glycol. The heat rejection of the resulting radiator was tested and it was found to be equivalent in heat transfer capacity to a copper fin radiator of the same design and dimensions. Although the aluminum fin radiator required more fins per inch than the copper fin radiator, its weight was only three-fourths that of the copper fin radiator.

In addition to the specific tests heretofore enumerated, numerous soldered assemblies of aluminum to itself and other metals, put together in accordance with the disclosure hereof, were subjected to many different tests and the results thereof have demonstrated the efficacy and commercial utility of the invention as herein disclosed.

The following examples illustrate various exemplifications of flux mixtures formulated and used as fluxing agents which fall within the scope of the invention but are not to be considered as limitative thereof.

A flux composition comprising 4 parts of stannous chloride, 4 parts of hydrazine monohydrobromide, and 1 part of ammonium chloride was dissolved in ethylene glycol to form a solution containing approximately 40% by weight of the salts. Other concentrations of this flux composition were also prepared by dissolving this dry mixture in ethylene glycol or acetone to form solutions containing salt concentrations of 20 to 50% by weight. The flux mixture may also be used in the form of a dry powder. Other formulations of said components in the order given were also prepared in the following ratios by weight: 3:2:1; 4:3:2; 4:2:1; 5:3:1; 3:5:1; 1:9:6; 4:11:11; and many others.

Some of the solders used successfully with the herein disclosed formulations are as follows: zinc; tin; 30/70 lead; 30/70 tin-zinc; 60/40 zinc-cadmium; 33⅓/33⅓/33⅓ zinc-tin-cadmium; 85/15 tin-zinc; 91½/8½ tin-zinc; 5/95 tin-cadmium; 30/70 tin-zinc containing a small per cent of antimony; and 30/70 tin-zinc containing a small per cent of copper.

A flux composition comprising 165 parts of stannous chloride, 14 parts of zinc chloride, 16 parts of hydrazine monohydrochloride, and 4 parts of ammonium chloride was dissolved in ethylene glycol to form a solution containing approximately 40% by weight of the salt mixture. Other concentrations of this particular composition were also prepared by dissolving the dry mixture in ethylene glycol to form solutions containing salt concentrations of 20% to 50% by weight. The salt mixture may be used in the form of a dry powder or may be dissolved in any other solvents previously mentioned.

A flux composition comprising 165 parts stannous chloride, 14 parts zinc dihydrazine chloride, 16 parts hydrazine monohydrobromide, and 4 parts ammonium chloride was dissolved in water so that the salt mixture comprised approximately 90% or more of the total resulting solution by weight, the water preferably being heated prior to the formation of the solution. This solution was then brought to the boiling point and cooled. The resulting solution may be maintained in a fairly free flowing condition at temperatures in excess of approximately 150° F. It may also be used as a dry powder or may be dissolved in any of the solvents previously mentioned.

A flux composition comprising 12.5 parts zinc chloride, 22.5 parts cadmium ammonium chloride, and 10 parts hydrazine monohydrobromide was dissolved in water to form a solution containing 45% by weight of the salts. This flux mixture is also soluble in ethylene glycol and acetone or may be used as a dry powder.

A flux composition was prepared by reacting zinc dihydrazine chloride with acetone to produce 3,5,5-trimethylpyrazoline zinc chloride. 50 parts of this complex were added to a mixture comprising 10 parts ammonium chloride and 2 parts hydrazine monohydrochloride. This composition is conveniently used in the form of a water solution which contains approximately 20 to 25% of the flux mixture by weight of the total resulting solution. Other concentrations of this flux composition have been prepared in which the salt comprised 10 to 50% by weight of the total resulting solutions. The particular examples cited are but specific combinations of the components which worked very well, and other formulations comprising the same components but in different ratios have been prepared and used with good results.

In addition to the utility of the foregoing compositions as soldering fluxes, tests were run in which fluxes according to the examples given were applied to aluminum and other metals in the absence of solder, and upon heating the flux to activate the same the metals of the flux composition were chemically deposited on the metal surfaces in the form of a film or plating which was alloyed to the metal on which it was deposited. If the first component consisted of a single metal salt, microscopic examination of the resulting article revealed a structure consisting of the plating metal, an intermetallic compound of the plating metal and the basis metal, and the basis metal. If the first component comprised more than one metal salt, the plating or coating was an alloy of these metals and the intermetallic compounds formed were combinations of these metals with the basis metal. This plating or coating was found to be useful in itself as a protective or decorative coating for aluminum and could be used as a basis for further soldering or for further coating and plating operations. Uniform coatings of great utility were also formed by producing a composite metal in the following manner:

Fluxes according to the examples given were applied to the metal to be coated and to a strip of solder foil, such for example as zinc foil, which were then placed in contact. After the flux had been activated and the solder foil had melted, a composite metal article was obtained which is useful for many purposes.

It is also possible according to the same technique to produce a composite metal article in which the strip of foil may be aluminum or other metals, in which case the metal foil does not melt when the flux is activated, but is actually soldered into a composite metal structure with the basis metal. Of course, any number of layers may be formed into a composite article according to the foregoing process. Such composite metal articles may have particular value, for example, in the formation of multi-ply tubing from aluminum and other metals.

I claim:

1. That method of applying a solder to a metal which includes the steps of: applying flux to said metal, activating said flux, and applying molten solder to the fluxed area of said metal, said flux essentially comprising as a first component at least one halide salt of a metal of the group consisting of zinc, cadmium, tin, antimony, bismuth and lead; as a second component at least one salt of the group consisting of semicarbazide salts, hydrazine salts, salts of hydrocarbon substituted hydrazines, and salts of heterocyclic substituted hydrazines; and as a third component at least one compound selected from the group consisting of hydroxylamine salts, morpholine salts, ammonium salts, alkylamine salts, arylamine salts, aralkylamine salts, alkarylamine salts, cycloalkylamine salts, saturated cyclic hydrocarbon amine salts in which the amino nitrogen is present in the cyclic structure, $R_1R_2R_3R_4NX$ in which $R_1$, $R_2$, $R_3$, and $R_4$ are selected from the group consisting of the methyl and ethyl radicals and in which X is a halogen atom, and aliphatic carboxylic acid amides containing from one to six carbon atoms, said flux comprising from about 5 to about 90% by weight of said first component, based upon the weight of said first, second and third components, and from about 2 to about 90% by weight of said third component, based upon the weight of said second and third components.

2. That method according to claim 1 in which said metal to which said flux and solder are applied is aluminum.

3. That method according to claim 1 in which said metal to which said flux and solder are applied is zinc.

4. That method according to claim 1 wherein said first component comprises zinc chloride and cadmium ammonium chloride and wherein said second component comprises a salt selected from the group consisting of hydrazine monohydrochloride, hydrazine monohydrobromide, 3,5,5 trimethylpyrazoline hydrochloride, and 3,5,5 trimethylpyrazoline hydrobromide, and wherein said salts are dissolved in a water solution.

5. That method according to claim 1 wherein said first component comprises 3,5,5 trimethylpyrazoline zinc chloride and wherein said second component comprises a salt selected from the group consisting of hydrazine monohydrochloride, hydrazine monohydrobromide, 3,5,5 trimethylpyrazoline hydrochloride, and 3,5,5 trimethylpyrazoline hydrobromide, and wherein said salts are dissolved in a water solution.

6. That method according to claim 1 wherein said first component comprises at least one salt of the group consisting of zinc chloride, stannous chloride, and 3,5,5 trimethylpyrazoline zinc chloride; wherein said second component comprises at least one salt of the group consisting of hydrazine monohydrobromide, hydrazine monohydrochloride, 3,5,5 trimethylpyrazoline hydrochloride, and 3,5,5 trimethylpyrazoline hydrobromide; and wherein said third component comprises at least one salt of the group consisting of ammonium chloride and ammonium bromide; and wherein said salts are dissolved in a solvent in which said salts will dissolve without hydrolysis.

7. That method according to claim 1 wherein said first component comprises at least one salt of the group consisting of zinc chloride, stannous chloride, and 3,5,5 trimethylpyrazoline zinc chloride; wherein said second component comprises at least one salt of the group consisting of hydrazine monohydrobromide, hydrazine monohydrochloride, 3,5,5 trimethylpyrazoline hydrochloride, and 3,5,5 trimethylpyrazoline hydrobromide; wherein said third component comprises at least one salt of the group consisting of ammonium chloride and ammonium bromide; and wherein said salts are dissolved in a solvent of the group consisting of the alcohols, the glycols, the ketones, water, and the methyl and ethyl esters of acetic acid and miscible mixtures thereof in which said salts will dissolve without hydrolysis.

8. That method of joining metals which includes the steps of: applying flux to a metal of the joint system, activating said flux, applying molten solder to the fluxed area of said metal, and employing said solder to integrally unite said metal to another metal of the joint system, said flux essentially comprising as a first component at least one halide salt of a metal of the group consisting of zinc, cadmium, tin, antimony, bismuth, and lead; as a second component at least one salt of the group consisting of semicarbazide salts, hydrazine salts, salts of hydrocarbon substituted hydrazines, and salts of heterocyclic substituted hydrazines; and as a third component at least one compound selected from the group consisting of hydroxylamine salts, morpholine salts, ammonium salts, alkylamine salts, arylamine salts, aralkylamine salts, alkarylamine salts, cycloalkylamine salts, saturated cyclic hydrocarbon amine salts in which the amino nitrogen is present in the cyclic structure, $R_1R_2R_3R_4NX$ in which $R_1$, $R_2$, $R_3$, and $R_4$ are selected from the group consisting of the methyl and ethyl radicals and in which X is a halogen atom, and aliphatic carboxylic acid amides containing from one to six carbon atoms, said flux comprising from about 5 to about 90% by weight of said first component, based upon the weight of said first, second and third components, and from about 2 to about 90% by weight of said third component, based upon the weight of said second and third components.

9. That method of treating a metal which includes the steps of: applying flux to a surface of said metal, and activating said flux so as to deposit a metallic film on said metal as a result of the decomposition of the flux, said flux essentially comprising as a first component at least one halide salt of a metal of the group consisting of zinc, cadmium, tin, antimony, bismuth, and lead; as a second component at least one salt of the group consisting of semicarbazide salts, hydrazine salts, salts of hydrocarbon substituted hydrazines, and salts of heterocyclic substituted hydrazines; and as a third component at least one compound selected from the group consisting of hydroxylamine salts, morpholine salts, ammonium salts, alkylamine salts, arylamine salts, aralkylamine salts, alkarylamine salts, cycloalkylamine salts, saturated cyclic hydrocarbon amine salts in which the amino nitrogen is present in the cyclic structure, $R_1R_2R_3R_4NX$ in which $R_1$, $R_2$, $R_3$, and $R_4$ are selected from the group consisting of the methyl and ethyl radicals and in which X is a halogen atom, and aliphatic carboxylic acid amides containing from one to six carbon atoms, said flux comprising from about 5 to about 90% by weight of said first component, based upon the weight of said first, second and third components, and from about 2 to about 90% by weight of said third component, based upon the weight of said second and third components.

10. A composition of matter essentially comprising as a first component at least one halide salt of a metal of the group consisting of zinc, cadmium, tin, antimony, bismuth and lead; as a second component at least one salt of the group consisting of semicarbazide salts, hydrazine salts, salts of hydrocarbon substituted hydrazines, and salts of heterocyclic substituted hydrazines; and as a third component at least one compound selected from the group consisting of hydroxylamine salts, morpholine salts, ammonium salts, alkylamine salts, arylamine salts, aralkylamine salts, alkarylamine salts, cycloalkylamine salts, saturated cyclic hydrocarbon amine salts in which the amino nitrogen is present in the cyclic structure, $R_1R_2R_3R_4NX$ in which $R_1$, $R_2$, $R_3$, and $R_4$ are selected from the group consisting of the methyl and ethyl radicals and in which X is a halogen atom, and aliphatic carboxylic acid amides containing from one to six carbon atoms, said composition comprising from about 5 to about 90% by weight of said first component, based upon the weight of said first, second and third components, and from about 2 to about 90% by weight of said third component, based upon the weight of said second and third components.

11. That method according to claim 9 in which said first component comprises 3,5,5-trimethylpyrazoline zinc chloride.

12. That method according to claim 9 wherein said first component comprises zinc chloride.

13. That method according to claim 9 wherein said second component comprises hydrazine monohydrobromide.

14. That method according to claim 9 wherein said second component comprises hydrazine monohydrochloride.

15. That method according to claim 9 wherein said third component comprises ammonium chloride.

16. That method according to claim 9 wherein said second component consists essentially of a material selected from the group consisting of hydrazine monohydrochloride and hydrazine monohydrobromide admixed with a 3,5,5 trimethylpyrazoline hydrohalide.

17. A composition of matter according to claim 10 wherein said first component comprises 3,5,5-trimethylpyrazoline zinc chloride.

18. A composition of matter according to claim 10 wherein said first component comprises zinc chloride.

19. A composition of matter according to claim 10 wherein said second component comprises hydrazine monohydrobromide.

20. A composition of matter according to claim 10 wherein said second component comprises hydrazine monohydrochloride.

21. A composition of matter according to claim 10 wherein said third component comprises ammonium chloride.

22. A composition of matter according to claim 10 wherein said second component consists essentially of a material selected from the group consisting of hydrazine monohydrochloride and hydrazine monohydrobromide admixed with a 3,5,5 trimethylpyrazoline hydrohalide.

23. A composition of matter according to claim 10 wherein said first component essentially comprises zinc chloride, said second component essentially comprises a 3,5,5 trimethylpyrazoline hydrohalide admixed with a material selected from the group consisting of hydrazine monohydrochloride and hydrazine monohydrobromide, and wherein said third component essentially consists of an ammonium halide.

References Cited in the file of this patent

UNITED STATES PATENTS

| Number | Name | Date |
|---|---|---|
| 1,263,656 | Fahrenwald | Apr. 23, 1918 |
| 1,783,642 | Fergusen et al. | Dec. 2, 1930 |
| 2,262,072 | Vaughn | Nov. 11, 1941 |
| 2,299,166 | Miller | Oct. 20, 1942 |
| 2,386,813 | O'Brien et al. | Oct. 16, 1945 |
| 2,417,662 | Rosales | Mar. 18, 1947 |
| 2,612,459 | Willard et al. | Sept. 30, 1952 |
| 2,612,460 | Willard et al. | Sept. 30, 1952 |
| 2,640,793 | Doerr | June 2, 1953 |